United States Patent Office 3,507,816
Patented Apr. 21, 1970

3,507,816
FOAMABLE POLYMERS CONTAINING A FLAME RETARDANT
David John Sims, Cardiff, Glamorgan, Wales, and Robert James Stephenson, Cwmbran, England, assignors to Monsanto Chemicals Limited, London, England, a British company
No Drawing. Filed June 13, 1967, Ser. No. 645,625
Claims priority, application Great Britain, June 15, 1966, 26,750/66; July 27, 1966, 33,790/66
Int. Cl. C08f 47/10; C09k 3/28
U.S. Cl. 260—2.5    4 Claims

ABSTRACT OF THE DISCLOSURE

There is disclosed a novel foamable product comprising particles of a foamable polystyrene having incorporated therein a volatile pentabromophenyl allyl ether in the amount of 0.1 to 1.5 percent by weight of the particles as a flame retardant agent. The foamable particles are highly advantageously provided by a process in which the styrene polymer is polymerized in the presence of the pentabromophenyl allyl ether and the volatile blowing agent.

BACKGROUND OF THE INVENTION

The present invention relates to foamable products and, more particularly, to foamable polystyrenes having flame retardant properties, and the method of making same.

Foamable thermoplastic materials are an important commodity to produce foamed products used in industry, commerce and construction because of their excellent heat insulating and cushioning properties, light weight and relatively low cost. Foamable particles are advantageous in that they supply a composition which can be molded easily by the end user in relatively simple equipment. Foamable polystyrene particles are commonly used in the production of foamed polystyrene by a process in which they are expanded by the action of heat so as to produce a "prefoam" of foamed beads which is subsequently heated by steam in a suitable mold. Further expansion and consolidation of the foamed beads takes place in the mold and an article conforming to the shape of the mold is produced. This practice is well-established but it is desirable in many instances that the foamed products should possess some degree of flame-retardancy, particularly when they are to be used in building construction. It has, therefore, been proposed to add a flame-retardant agent to the polymer in order to impart flame-retardant properties, but many compounds that would otherwise be good flame-retardant agents have a deleterious effect on the mechanical properties of the foamed product. Generally, the presence of a halogen-containing flame-retardant agent adversely affects the mechanical properties of foamed polystyrenes in several ways.

It is an object of the present invention to provide novel foamable polystyrene polymer compositions which will produce foamed products having excellent flame retardance and highly satisfactory mechanical properties.

Another object is to provide a process for making such compositions at relatively low cost and with facility.

SUMMARY OF THE INVENTION

It has now been found that the foregoing and related objects may be readily attained in a foamable polystyrene composition comprising particles of a styrene polymer having incorporated therein a volatile blowing agent and 0.1 to 1.5 percent by weight of pentabromophenyl allyl ether as a flame-retardant agent. In accordance with the present process, the styrene monomer formulation is polymerized in the presence of the flame-retardant and blowing agent so that the two components are intimately incorporated throughout the polymer as recovered from the polymerization reaction.

By using the foamable polystyrene particles of the present invention, it is found surprising that a relatively small amount of flame-retardant on the order of 0.4 to 0.5 percent by weight produces foamed products having highly desirable self-extinguishing properties.

In general, the blowing agent that is employed will be a substance that volatilizes on heating such as a low-boiling liquid. In some instances, the volatile agent may be one that is gaseous at atmospheric pressure and ordinary temperatures, such as 20° centigrade, but it is preferably a volatile liquid which most desirably swells but does not dissolve the polymer. Examples of volatile substances that can be used include lower aliphatic hydrocarbons such as a butane, a pentane, a hexane, cyclopentane or cyclohexane; lower alkyl halides such as methyl chloride, trichloromethane or 1,2-dichlorotetrafluoroethane; and mixtures of these substances. The lower aliphatic hydrocarbons, especially the pentanes, are preferred, and in practice a petroleum fraction consisting predominantly of pentanes can usefully be employed. From 2 to 15 percent and especially 3 to 10 percent by weight based on the weight of the foamable polystyrene material is often a suitable proportion of blowing agent. Specifically, the use of about 6 percent by weight of a pentane fraction in conjunction with polystyrene has given excellent results.

The quantity of the pentabromophenyl allyl ether flame-retardant that is incorporated within the particles depends on several factors including the degree of flame-retardancy that it is desired to impart to the final foamed product. In general, it is preferable for the foamable polystyrene particles to contain 0.2 to 1.0 percent and more preferably about 0.25 to 0.75 percent of the flame-retardant agent with highly desirable results being obtained at 0.3 to 0.6 percent by weight. It has been found that a quantity of the flame-retardant in the lower part of the range is often sufficient, for instance about 0.4 or 0.5 percent by weight. In general, the percentage content of flame-retardant agent based on the weight of the foamable particles is about the same as the percentage based on the weight of styrene plus blowing agent used in a polymerization reaction, or the weight of the final foamed product. However, small losses can occur depending on the conditions of polymerization and recovery. In many instances improved results are obtained when a relatively high-purity grade of the flame-retardant is employed since catalysts used to prepare the compound may have deleterious effects upon color or physical properties.

A process of incorporation which is particularly effective is to arrange for the flame-retardant agent to be present during a process of suspension polymerization in which the foamable polystyrene is formed so that the agent thereby becomes incorporated in the resulting particles of polymer. Where this procedure is employed the suspension polymerization system is conventional for this type of operation so far as the reaction conditions, blowing agent, catalyst and suspending agent are concerned. The temperature will generally be about 60° centigrade to 100° centigrade or higher and the pressure generally about 1 to 10 atmospheres. Catalysts that can be used include peroxy compounds such as cumene hydroperoxide, benzoyl peroxide and acetyl benzoyl peroxide, alone or in conjunction with a reducing agent, so as to set up a Redox system; azo compounds such as azobisisobutyronitrile; and other conventional catalysts. The aqueous system is agitated, usually by means of a stirrer, so as to keep the styrene monomer formulation in suspension, and suspending agents are normally employed such as water-insoluble inorganic oxides, hydroxides and salts, and organic water-soluble polymers such as polyvinyl alcohols, methyl cellulose, gelatine, polyvinylpyrrolidone, carboxymethylcellulose and its water-soluble salts, and polyacrylic acids and their water-soluble salts. After the suspension polymerization, the system is allowed to cool to room temperature and the pressure is adjusted to atmospheric pressure, and the foamable polystyrene particles in the form of beads can then be decanted, washed, and dried.

Foaming and molding operations that are carried out on the foamable polystyrene material can follow ordinary practice. Thus, the foamable particles can be heated by steam, hot water or hot air, or under the influence of an infra-red heater, to produce foamed particles, and these are preferably conditioned by exposing them to the atmosphere for a day or two before they are used in the molding operation. A suitable mold can then be fully or partially filled with foamed particles and closed and steam injected through inlets in the mold walls. When foaming is complete, the steam supply is shut off and the resulting flame-retardant shaped product is allowed to cool before the mold is opened. Other methods of molding an article can also be employed.

The styrene polymers may be styrene homopolymers or styrene copolymers in which the predominant component is a monovinylidene aromatic hydrocarbon of the styrene type. Styrene monomers include styrene per se, halogenated styrenes such as chlorostyrene and alkyl substituted styrenes such as vinyltoluene and alpha-methyl styrene. The monomers which may be copolymerized with the styrenes are unsaturated nitriles such as acrylonitrile, alkyl acrylates such as methyl methacrylate and vinyl esters such as vinyl acetate. Generally, the styrene component will comprise at least 80 percent by weight of the total polymer. In addition, the resin may contain other components including natural or synthetic rubbers, pigments, nucleating agents, etc. Graft copolymers obtained by polymerizing the monomers in the presence of a rubber substrate may be desirable for certain applications, particularly where toughness is sought. The preferred resins are polystyrene homopolymers or copolymers with relatively minor amounts of comonomers of the unsaturated nitrile or acrylate series, with the most common products being homopolystyrenes. The term "polystyrene" as employed herein includes homopolymers and copolymers of the styrene monomers described above alone and in conjunction with minor amounts of other components.

DESCRIPTION OF THE PREFERRED EMBODIMENT

Illustrative of the efficacy of the present invention are the following specific examples wherein all percentages are percentages by weight unless otherwise indicated.

Example 1

Particles containing about 0.5 percent of pentabromophenyl allyl ether were prepared during polymerization. To a reactor fitted with a stirrer were added 2.2 liters water, 8 grams of polyvinylpyrrolidone (molecular weight about 300,000), 2.1 grams sodium pyrophosphate, 0.2 gram sodium bicarbonate, 850 grams styrene, 4.5 grams pentabromophenyl allyl ether (M.P. 160° centigrade), 6 grams benzoyl peroxide and 54 grams petroleum ether having a boiling range of 45 to 50° centigrade. After adding nitrogen to a pressure slightly above atmospheric pressure, the reactor was closed and heated to 82° centigrade for nine hours while stirring. At this stage, about 50 percent of the styrene monomer had polymerized, and thereafter, an additional 12 grams of the petroleum ether were added over three hours under pressure and the polymerization was continued at 82° centigrade with stirring for a further twenty-one hours. At this time, the reactor was allowed to cool, vented to atmospheric pressure and opened. The resulting roughly spherical particles or beads were separated.

The particles were foamed in a steam atmosphere for four minutes resulting in spherical foamed beads which were free from surface deformities and had a bulk density of 11 ounces per cubic foot. After allowing the foamed beads to dry on an open tray for one day, they were molded into a 1 foot cube block that had good physical properties with the beads being well bonded together.

The flame-retardant properties of the block were excellent, as was shown by carrying out the following tests.

The foamed product was tested for flame-retardant properties by British Standard 3932 (1965) using sample strips 8 inches x 1 inch x ½ inch cut from the molded block. Six such strips were employed in the test and the resulting Flame Test Rating was 6 out of 6 self-extinguishing.

The results were confirmed by using a rather more rigorous test, a modified British Standard, known as Plastics Test Method No. 117/1. Four sample strips were employed, each being 6 inches x 2 inches x ½ inch. The Flame Test Rating was 3 out of 4 self-extinguishing and 1 out of 4 non-burning. This was again evidence of an excellent degree of flame retardance.

Example 2

In this example, the polystyrene particles contained about 0.2 percent of the flame retardant. To a reactor fitted with a stirrer were added 2.2 liters water, 8 grams of polyvinylpyrrolidone (molecular weight about 300,000), 2.1 grams sodium pyrophosphate, 0.2 gram sodium bicarbonate, 850 grams styrene, 1.6 grams pentabromophenyl allyl ether (melting point 159–161° centigrade), 6 grams benzoyl peroxide and 54 grams petroleum ether having a boiling range of 45° to 50° centigrade. After adding nitrogen to a pressure slightly above atmospheric pressure, the reactor was closed and heated to 80° centigrade for ten hours while stirring. At this stage about 50 percent of the styrene had polymerized, and thereafter 12 grams of petroleum ether were then added over three hours under pressure and the polymerization was continued at 82° centigrade with stirring for a further twenty-one hours. At this time, the reactor was allowed to cool, vented to atmospheric pressure and opened. The resulting particles were separated.

The particles were foamed in a steam atmosphere for four minutes, resulting in spherical foamed beads that were free from surface deformities and had a bulk density of 11 ounces per cubic foot. After allowing the foamed beads to dry on an open tray for one day, they were molded into a 1 foot cube block that had good physical properties, with the beads being well bonded together. The molded foamed block contained about 0.2 percent of the flame-retardant.

The flame-retardant properties of the block were again excellent as shown by carrying out the tests described in Example 1. For British Standard 3932, the Flame Test Rating was 6 out of 6 self-extinguishing.

Thus, it can be seen that the present invention provides a novel and highly advantageous foamable polystyrene composition having a highly desirable degree of flame retardance and satisfactory physical properties. The foamable compositions are produced relatively economically and easily by incorporating the flame retardant during polymerization of the styrene monomer formulation in aqueous dispersion.

Having thus described the invention, we claim:

1. A foamable polystyrene composition comprising particles of polystyrene having incorporated therein a volatile blowing agent and 0.1 to 1.5 percent by weight of the particles of pentabromophenyl allyl ether as the sole flame-retardant agent.

2. The foamable polystyrene composition according to claim 1 wherein the flame-retardant agent comprises 0.2 to 1 percent by weight of the particles.

3. The foamable polystyrene composition according to claim 1 wherein the flame-retardant agent comprises about 0.5 percent by weight of the particles.

4. The foamable polystyrene composition according to claim 1 wherein the blowing agent is a lower aliphatic hydrocarbon.

References Cited

UNITED STATES PATENTS

| | | |
|---|---|---|
| 3,001,954 | 9/1961 | Buchholtz et al. |
| 3,093,599 | 6/1963 | Mueller-Tamm et al. |
| 3,269,962 | 8/1966 | Eichhorn. |
| 3,271,333 | 9/1966 | Eichhorn. |

SAMUEL H. BLECH, Primary Examiner

M. FOELAK, Assistant Examiner

U.S. Cl. X.R.

260—45.7, 93.5